Dec. 13, 1932.  F. ATHIMON  1,890,446

SERVO BRAKE

Filed April 11, 1930   2 Sheets-Sheet 1

F. Athimon
INVENTOR

Dec. 13, 1932.  F. ATHIMON  1,890,446
SERVO BRAKE
Filed April 11, 1930   2 Sheets-Sheet 2
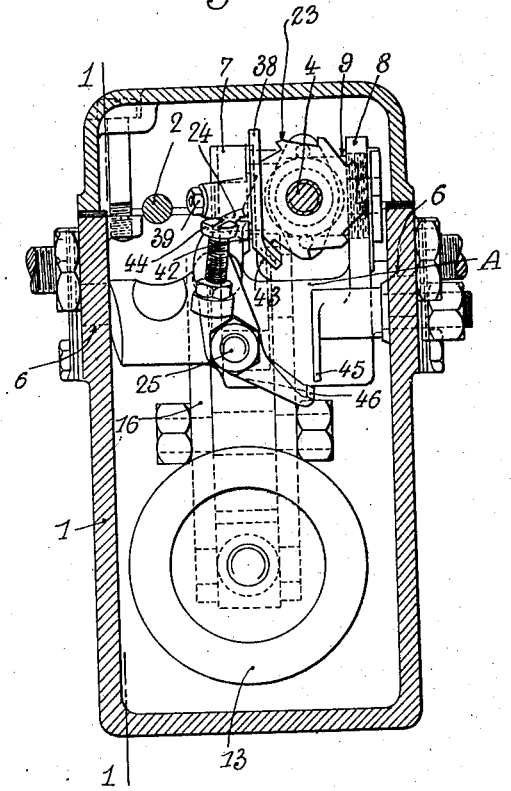
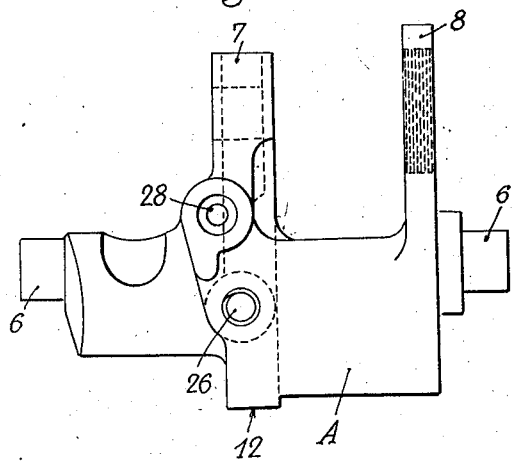
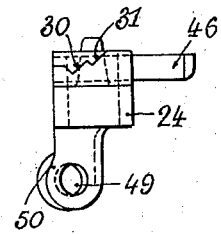
F. Athimon
INVENTOR Patented Dec. 13, 1932

1,890,446

UNITED STATES PATENT OFFICE

FRANCIS ATHIMON, OF PARIS, FRANCE

SERVO-BRAKE

Application filed April 11, 1930, Serial No. 443,580, and in France April 23, 1929.

The present invention relates to servo-brakes of the type in which an operating rod connected to the pedal or to a device controlled by the driver, on the one hand, and a controlling rod proceeding to the brakes, on the other hand, are pivotally mounted on a main lever which is adapted to pivot upon an axle and is provided with a cam controlled by a spring, which latter acts in cooperation with the force exercised by the driver, in order to effect the braking action.

One object of the invention is to obtain a modification in the lengths of the lever arms of the actuating forces in order to increase the braking action, according to the progress of the braking operation. For this purpose, the points at which the said pedal rod and braking rod are pivoted to the said main lever are disposed with reference to the pivoting axis of said lever in such manner that when the braking action takes place, the distance between the pivoting axis and the pedal rod will increase, whilst the distance between said axis and the braking rod will diminish.

Another object of the invention consists in maintaining a constant stroke for the main lever of the servo-brake, irrespectively of the stroke of the pedal of the vehicle upon which the servo-brake is mounted. For this purpose, the point at which the pedal rod is pivoted to the main lever may be moved from or towards the pivoting axis of the lever.

The invention has further for its object the use of the servo-brake with rod-and-link gear having different lengths of stroke, and for this purpose, the said braking rod is mounted on a pivoting arm to which is pivoted, at an adjustable distance from the pivoting axis of said arm, the rod controlling the rod-and-link gear of the brakes.

Lastly, the principal parts of a simplified device for taking up the wear are mounted directly on the braking rod of the servo-brake apparatus.

The accompanying drawings, show, by way of example, an embodiment of the invention.

Fig. 3 is a vertical cross section on line 3—3 of Fig. 1.

Fig. 4 is a side view of the main lever of the servo-brake.

Fig. 5 is a plan view of the pawl.

Figure 1:
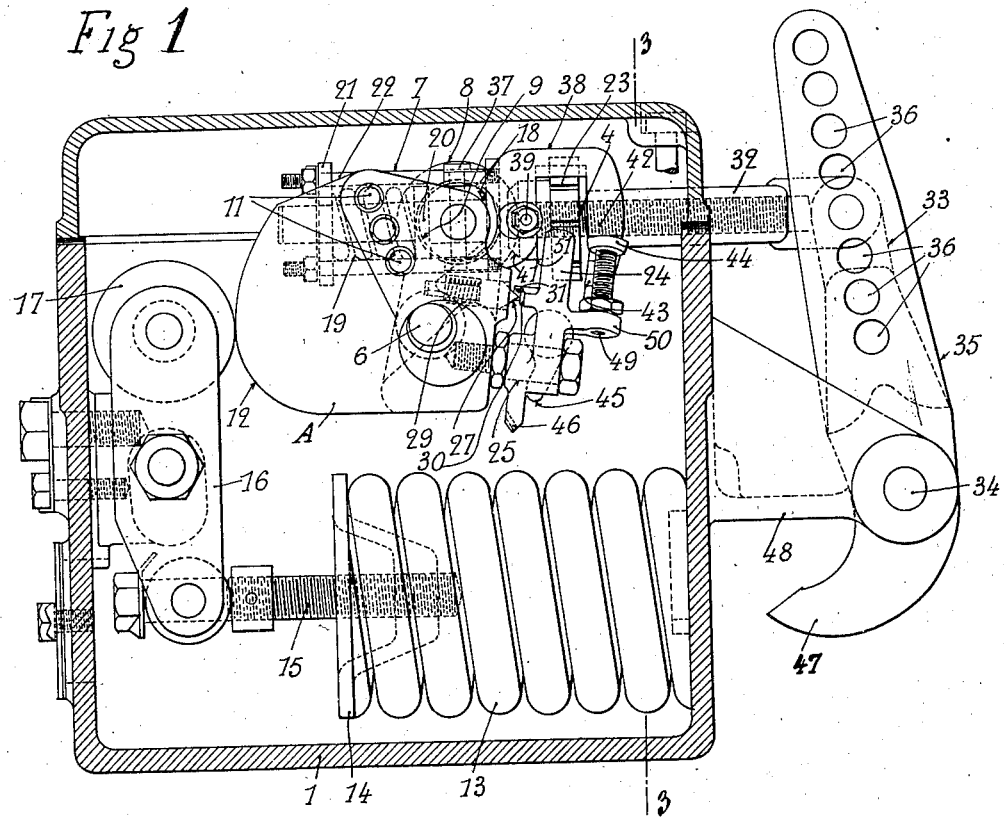
Fig. 1 is a vertical section on line 1—1 of Fig. 3 of the apparatus in an intermediate position of the stroke of the several parts, at the end of the inoperative stroke, and at the beginning of the braking stroke.

The mechanism of the servo-brake is contained in a box 1; into this latter is inserted on the one hand, a rod 2 connected with the pedal (or like device) under the driver's control, said rod being covered by a dust-protector 3 mounted in the said box, and on the other hand a rod 4 controlling the brakes, which is covered by a dust-protector 5 mounted in said box. The rods 2 and 4 are pivoted to a main lever A which is pivotally mounted on an axle 6 supported in the lateral walls of the box 1. The said main lever A, which is shown separately in side view in Figure 4, has two cheeks 7—8 between which is mounted an axle 9 whose middle enlarged part is freely traversed by the said brake rod 4. The pedal rod 2 is pivoted on an axle 10 engaging in one of the holes 11 in the cheek 7; said holes are preferably in line with the centre of the said axle 6, and by this means the axle 6 and the main lever 7—8 are given a constant stroke for different strokes of the pedal. The servo-brake can thus be mounted upon vehicles of different types in which the pedals have different lengths of stroke.

The cheek 7 of the main lever is extended so as to form a cam 12 subject to the tension of a spring 13 through the medium of a disk 14 and of a threaded rod 15 screwing into said disk and pivoted to one end of a rocking lever 16 on whose other end is mounted a roller 17 in contact with said cam 12. The outline of the cam is such that the force of the spring on said cam will be exercised, after the end of the inoperative stroke, according to directions which are more and more spaced from the axle 6 during the braking operation by an amount depending upon the angular displacement of the main lever under the action of the controlling rod 2.

A disk 18, loose on the rod 4, is normally applied against the axle 9 by means of a calibrated spring 19 surrounding the rod 4 and bearing at one end upon a shoulder 20 of the rod 4 and at the other end upon a strap 21 connected with the disk 18 by bolts 22, and thus the spring 19 will normally apply the disk 18 and shoulder 20 against the said axle 9.

On the rod 4 is mounted a ratchet wheel 23 cooperating with a pawl 24 pivotally mounted on an axle 25 disposed in an aperture 26 in the cheek 7 of the main lever. A pointed stud 27, guided in a hole 28 in the cheek 7, is driven by a spring 29 into one of the stopping notches 30 or 31 formed on the said pawl 24. In the idle position, said pawl makes contact with the ratchet wheel, and the pointed stud 27 is engaged in the notch 30. When the said pawl turns on its axle 25 and is thus separated from the ratchet wheel 23, the said stud will slide upon the face of the notch 30 adjacent the other notch 31, and if the amount of motion of the pawl is insufficient, the stud will tend to bring back the pawl upon the ratchet wheel; but when the motion of the pawl becomes greater the stud 27 will slide upon the whole inclined face of the notch 30 and hence engages in the other notch 31, thus holding the pawl, which can no longer descend upon the ratchet wheel.

The brake rod 4 is threaded outwardly of the ratchet wheel 23 (at the right of Figure 1) and this threaded part is screwed into a threaded bracket 32 which is pivoted to an arm 33 keyed to an axle 34 mounted upon supports 48. To the same axle 34 is keyed a lever 35 having a series of holes 36, in one of which can be pivoted the rod controlling the rod-and-link gear of the brakes. A rotation of wheel 23 and hence of rod 4 in one or the other direction will move the said bracket 32 outwardly or inwardly, as well as the lever 35, with reference to the ratchet wheel 23, thus taking up the wear. The various holes 36 in the lever 35 allow the servo-brake to be used upon different vehicles having different strokes for the rod-and-link gear.

Upon a pin 37 disposed on the axle 9 is pivotally mounted a plate 38 carrying a pointed stud 39, which is urged towards the rod 4 by a spring 40, and said stud can be applied upon a tapered contact surface 41 of the ratchet wheel which is formed at the end of a cylindrical part 51. The said plate 38 which extends over the ratchet wheel comprises a cam-shaped lug having a flat surface 42 which is substantially parallel with the cheeks 7 and 8 of the main lever, and also an inclined surface 43. In the path of said lug 42—43, which is adapted to pivot about the said pin 37, is a stop screw 44 engaged in a hole 49 pierced in a lug 50 of the pawl 24. A fixed stop 45, secured to one side of the box 1, is situated in the path taken by the rear end 46 of the pawl, when it rotates about the axle 6, when the said pawl is separated from the ratchet wheel and the stud 27 is engaged in the notch 31.

The operation of the said apparatus is as follows:

When the driver draws upon the rod 2, the main lever A rotates on the axle 6 in the clockwise direction (Fig. 1). During the inoperative stroke, the rod 4 offers no appreciable reaction against this motion of the main lever, and the spring 19 is of sufficient strength for the displacement of the whole device consisting of the axle 9, disk and shoulder 18—20 and rod 4; but at the end of the inoperative stroke and when the brakes begin to operate, the reaction due to the rod 4 will prevail over the force of the spring 19, thus causing a momentary stopping of the rod 4 and the axle 9 now slides along this rod, thus driving the disk 18, and the latter, through the medium of the bolts 22 and strap 21, compresses the spring 19. When this displacement of the disk 18 and axle 9 with reference to the rod 4 has brought the said disk into contact with the tapered part 41 pertaining to the ratchet wheel 23, which part is also mounted on the rod 4, this rod will be again impelled by the main lever, as a rigid whole, by means of the ratchet wheel, the disk 18 and the axle 9. The braking now takes place, and the tension of the spring 13 cooperates with the driver's action for the application of the brakes, the outline of the cam 12 being such that the direction of the force imparted by the roller 17 to said cam 12 will become further separated from the axle 6 according as a greater traction is exercised upon the rod 2. The slight relative movement between the rod 4 on the one hand, and the disk 18 and axle 9 on the other hand, between the end of the inoperative stroke and the commencement of the braking action, is utilized for the control of the mechanism employed to take up the wear.

Figure 2:
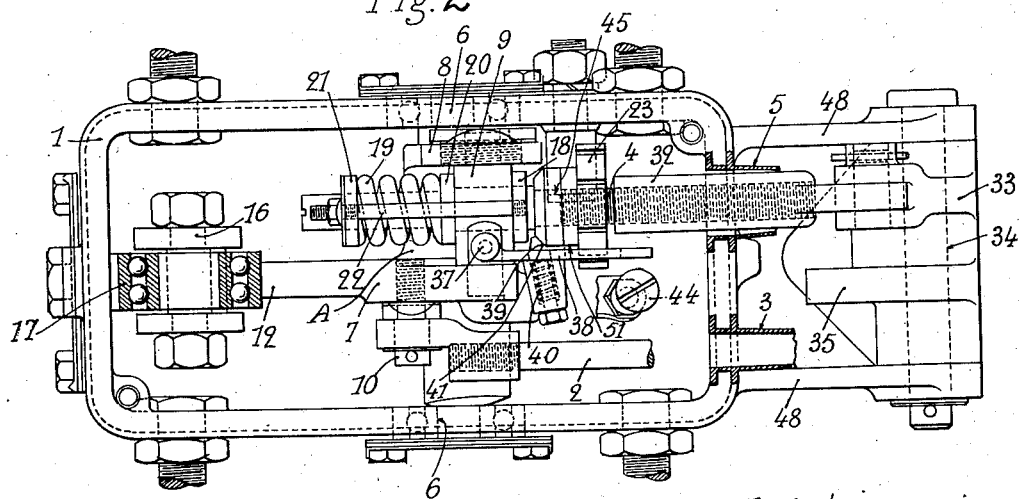
Fig. 2 is a plan view of the mechanism of the servo-brake.

If no wear has taken place, the inoperative stroke is normal, and when this has been completed, the main lever, when rotating about the axle 6, will draw with it the axle 9 and plate 38, and hence the stud 39, which makes contact with the tapered surface 41 (momentarily in the fixed position) will now be driven upon the cylindrical part 51 and thus causes the plate 38 to turn about its pin 37, so that the straight part 42 of said plate 38 will make contact with the screw 44 of pawl 24, and the said pawl will thus be separated from its ratchet wheel to a sufficient degree to allow the stud 27 to engage in the notch 31. The pawl will maintain this position during the whole of the braking action. When the brakes are released, the rod 4 will cause the axle 9 and the main lever to turn about the axle 6 in the counter-clockwise direction (Fig. 1), also turning—about the axle 6—the pawl 24 whose rear end 46, making contact with the stop 45, will oblige the stud 27 to leave its notch 31, and thus the pawl will descend upon the ratchet wheel in the same tooth which it occupied before the brakes were applied. Due to the descent of the pawl, the head of the screw 44 will return the plate 38 to its normal position (Figs. 2 and 3).

On the contrary, if the apparatus has become worn, the inoperative stroke will be longer, and the main lever will turn together with the pawl 24 about the axle 6, during this stroke, through a greater angle than would be covered had there been no wear. Since the plate 38 pivoting with the axle 9 follows the movements of inclination of the head of the rod 4, passing through said axle 9, it will follow that the head of the screw 44, when turning about the axle 6, instead of remaining adjacent the straight part 42 of the plate 38, will be situated next the oblique face 43 of said plate. At the end of the inoperative stroke, the stud 39 and the plate 38 will be driven out as in the preceding case, but since the screw is now adjacent the oblique part 43, the expelling action on the head of the screw 44 will be delayed, and the pawl will not be sufficiently driven out to allow the stud to entirely leave the notch 30, and thus the pawl will descend upon its ratchet wheel, and on a tooth next the one it left by reason of the pivoting of the pawl on its axle 6.

When the brakes are released, the main lever, which turns together with the pawl 24 in the clockwise direction, will oblige the ratchet wheel to turn by one tooth in order to take up the wear. During this rotation, the head of the screw 44 will first make contact with the face 43 and then with the face 42 of the plate 38, thus driving said plate to its idle position, as shown in Figures 2 and 3. To prevent all jamming during this driving action, the spring 40 allows the stud 39 to disappear while in contact with the cylindrical part 51. When the stud 39 coincides with the tapered surface 41, the spring 40 will drive the stud 39 into its normal position.

According as the brakes are applied, the axle 10 to which is pivoted the pedal rod 2, will turn in the clockwise direction, and thus the distance between the axle 6 and the rod 2 becomes greater, that is, the lever arm by which the rod 2 acts upon the axle 6 is increased. On the contrary, the axle 9 for the pivoting of the brake rod 4 is so disposed relatively to the centre 6 that the distance between axle 6 and rod 4 will become smaller as the brakes are applied with greater force. This affords a variable speed-reduction which increases according as the brakes are applied.

The lever 35 comprises a rear end 47, which may make contact with the support 48 in order to prevent the rod 4 from leaving the bracket 32 when the threaded part of the rod 4 is only engaged by a few threads in said bracket.

Obviously, the said axle 34 with the lever 35 controlling the rod-and-link gear, instead of being disposed, as in Figure 1, at the right of the servo-brake mechanism, may be situated at the left of this mechanism. Herein, the rod 4 will no longer operate by compression, but will be subject to traction.

It is evident that the aforesaid apparatus is susceptible of various modifications without departing from the principle of the invention.

Having now described my invention what I claim as new and desire to secure by Letters Patent is:

1. In a braking device, an operating rod adapted to be moved by an operator, a stationary axle, a main lever adapted to be rotated on said axle, a tensioned spring, means adapted to transmit the tension of said spring to said main lever along variable directions differently distant from said stationary axle, a pivoting connection between said main lever and said operating rod located on a perpendicular drawn from the centre line of said axle on said operating rod, said perpendicular sloping in a direction opposite the direction of the movement of said operating rod during the operator's action, and a controlling rod pivoted to said lever and adapted to be connected with the brakes.

2. In a braking device, an operating rod adapted to be moved by an operator, a stationary axle, a main lever adapted to be rotated on said axle and provided with a plurality of holes differently distant from said axle and located on a perpendicular drawn from the centre line of said axle on said operating rod, said perpendicular sloping in a direction opposite the direction of the movement of said operating rod during the operator's action, a pivoting connection between said main lever and said operating rod adapted to be engaged in one of said holes, a tensioned spring, means adapted to transmit the tension of said spring to said main lever along variable directions differently distant from said stationary axle, and a controlling rod pivoted to said lever and adapted to be connected with the brakes.

3. In a braking device, a stationary axle, a main lever adapted to be rotated on said axle, an operating rod adapted to be moved by an operator and pivoted to said main lever, a tensioned spring, means adapted to transmit the tension of said spring to said main lever along variable directions differently distant from said stationary axle, a controlling rod adapted to be connected with the brakes and a pivoting connection between said main lever and said controlling rod mounted on the lever and rotatable about the axis of said axle in the direction of the movement of said controlling rod during brake actuation, the distance between said control rod and said axle diminishing as the brakes are applied with greater force.

4. In a braking device, a stationary axle, a main lever adapted to be rotated on said axle, an operating rod adapted to be moved by an operator and pivoted to said main lever, a pivot journalled in said main lever, a controlling rod passing loosely through said pivot and provided with a threaded portion at one of its ends, a threaded bracket engaging said threaded portion of said controlling rod and adapted to be connected with the brakes and to slide without rotating on said controlling rod, a ratchet wheel secured on said controlling rod, a pawl rotatably mounted on said main lever and adapted to engage said ratchet wheel, a stop piece on said controlling rod, a disk loosely mounted on said controlling rod, yielding means adapted to urge said disk against said pivot, a cam rotatably mounted on said pivot and provided with a projecting portion and with a retracted portion adapted to engage said pawl, cooperating surfaces secured on said controlling rod and on said cam adapted to move said cam when said pivot is moved with relation to said controlling rod, yielding holding means carried on said main lever and adapted to retain said pawl when said pawl has been rotated by said cam.

5. In a braking device as claimed in claim 4, the further feature consisting in a stationary member in the path of said pawl when this pawl is spaced apart from said ratchet wheel and adapted to release said pawl from said holding means.

In testimony whereof I have signed my name to this specification.

FRANCIS ATHIMON.